F. ALBERT.
PIPE JOINT.
APPLICATION FILED MAY 26, 1911.

1,065,892.

Patented June 24, 1913.

WITNESSES

INVENTOR
FRANZ ALBERT

UNITED STATES PATENT OFFICE.

FRANZ ALBERT, OF DUSSELDORF-RATH, GERMANY.

PIPE-JOINT.

1,065,892.  Specification of Letters Patent.  Patented June 24, 1913.

Application filed May 26, 1911. Serial No. 629,548.

*To all whom it may concern:*

Be it known that I, FRANZ ALBERT, a subject of the King of Prussia, and residing at Dusseldorf-Rath, Germany, have invented certain new and useful Improvements in Pipe-Joints, of which the following is a specification.

My invention relates to pipe joints and particularly to joints of the type in which the adjacent pipe ends are provided with annular abutments behind which are located flanges or independent rings carrying bolts by means of which the parts are drawn together to make a tight joint.

Figure 1:
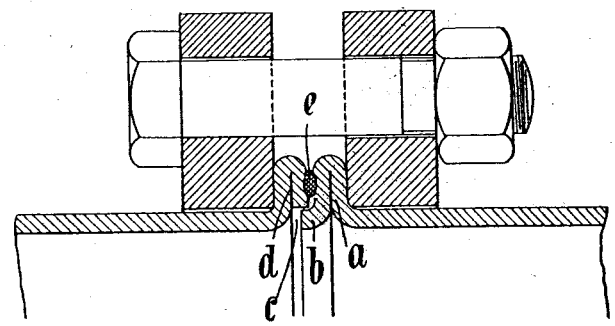
Figure 2:
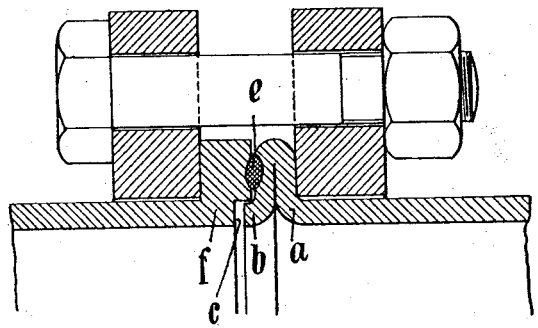

The object of my invention is to improve joints of this character in the particulars hereinafter described and shown in the accompanying drawing in which, Figure 1 is a longitudinal section through portion of a pipe joint in which my invention is embodied in one form; and Fig 2 is a similar view of a modification.

The present invention relates particularly to the coöperating abutments of the juxtaposed pipe ends and resides in the novel shape given thereto and the novel function thereby secured.

The abutment on the end of one of the pipes is formed in well known manner by folding the pipe metal into a radial annular flange, but differs from those heretofore employed in that I now provide the same with a forwardly extending offset which engages in a corresponding recess in the juxtaposed face of the coöperating abutment. The latter may comprise a folded member of the same character or it may be shaped from a solid enlargement of the pipe end, for example it may be shaped from the mass which is formed at the pipe end during rolling in tube mills of the step-by-step type.

In the joint shown in Fig. 1, the folded abutment *a* is provided with a forwardly extending annular offset *b*. The offset *b* engages in the recess *c* of the coöperating folded abutment *d*. This engagement between the offset and the recess *c* serves to center the coöperating pipe ends with relation to each other and to bring into register the calking grooves in the opposed faces of the abutments. As is readily understood this is of great value since it assures the proper positioning and functioning of the calking ring *e*. Furthermore this offset *b* substantially closes, on the interior of the pipe, the aperture between the opposed abutment faces which are slightly spaced apart by the presence of the calking ring and thus prevents injury to the calking ring through the abrasive action of sand or the like carried by fluid passing through the pipe. This device makes it possible to safely employ lenticular calking rings of either rubber or copper.

In Fig. 2 the recessed abutment is not made in the folded form of Fig. 1, but is shaped from the solid annular head at the pipe end which is formed during rolling out in the tube mill. This form of abutment so strengthens the joint, especially in view of its engagement by the forwardly extending offset on the coöperating folded abutment that it may safely be employed in high pressure pipe lines. Thus in this form of the joint, advantageous use has been made of a portion of the pipe, viz., the enlarged head end, which has heretofore been considered a necessary but useless adjunct to the rolled tube, and removed before the tube has been considered finished.

I claim as my invention:—

A pipe joint of the character described comprising butt-ended pipes having their ends folded outward to form radial abutment flanges for independent joint-clamping rings, said flanges being annularly recessed in register on their meeting faces to receive an interposed calking ring, one of said pipes having its end fold forwardly extended to form a centering and calking-protecting flange alined with the pipe and the other pipe end having its end fold shortened to afford a recess in which said forwardly projecting centering flange lies with its inner face flush with the inner face of the pipe, substantially as described.

In testimony whereof I have signed my name to this specification, in the presence of two subscribing witnesses.

FRANZ ALBERT. [L. S.]

Witnesses:
 W. MOLIER,
 AUG. SCHINDLER.